(12) United States Patent
Abe et al.

(10) Patent No.: US 8,220,423 B2
(45) Date of Patent: Jul. 17, 2012

(54) ROLLER BEARING, CAMSHAFT SUPPORT STRUCTURE, AND INTERNAL COMBUSTION ENGINE

(75) Inventors: Katsufumi Abe, Iwata (JP); Hiroki Tsuchiyama, Utsunomiya (JP); Shinji Oishi, Iwata (JP); Noriaki Fujii, Wako (JP); Tomoya Fujimoto, Wako (JP); Keiko Yoshida, Wako (JP); Kazuto Abe, Wako (JP); Kiminori Komura, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 12/310,675

(22) PCT Filed: Aug. 30, 2007

(86) PCT No.: PCT/JP2007/066943
§ 371 (c)(1),
(2), (4) Date: Mar. 4, 2009

(87) PCT Pub. No.: WO2008/029715
PCT Pub. Date: Mar. 13, 2008

(65) Prior Publication Data
US 2010/0012059 A1 Jan. 21, 2010

(30) Foreign Application Priority Data

Sep. 4, 2006 (JP) .................... 2006-238430
Sep. 4, 2006 (JP) .................... 2006-238431

(51) Int. Cl.
*F01L 1/00* (2006.01)
(52) U.S. Cl. ........ 123/90.1; 384/457; 384/548; 384/906

(58) Field of Classification Search ................ 123/90.1, 123/90.15–90.17; 384/457, 419, 428, 429, 384/418, 294, 499, 501–506, 570, 560, 564, 384/569, 577, 585, 548
See application file for complete search history.

(56) References Cited

U.S. PATENT DOCUMENTS

| | | | | | |
|---|---|---|---|---|---|
| 1,921,488 | A | * | 8/1933 | Smith | 384/570 |
| 2,528,987 | A | * | 11/1950 | Albett | 384/570 |
| 4,231,623 | A | * | 11/1980 | Kaufman | 384/429 |
| 7,311,447 | B2 | * | 12/2007 | Takeo et al. | 384/457 |
| 2004/0136627 | A1 | * | 7/2004 | Klier | 384/429 |
| 2007/0081748 | A1 | * | 4/2007 | Sitter | 384/294 |
| 2009/0136169 | A1 | * | 5/2009 | Katayama et al. | 384/457 |

FOREIGN PATENT DOCUMENTS

| | | |
|---|---|---|
| DE | 198 44 203 A1 | 3/2000 |
| JP | 57-045927 | 9/1982 |
| JP | 2002-227852 | 8/2002 |
| JP | 2005-090696 | 4/2005 |
| JP | 2005-180459 | 7/2005 |
| JP | 2006-125606 | 5/2006 |
| JP | 2006125606 A * | 5/2006 |
| JP | 2006-183837 | 7/2006 |

* cited by examiner

*Primary Examiner* — Thomas Denion
*Assistant Examiner* — Daniel Bernstein
(74) *Attorney, Agent, or Firm* — Clark & Brody

(57) ABSTRACT

A roller bearing includes an outer ring formed by connecting a plurality of arc-shaped outer ring members in a circumferential direction and a plurality of rollers arranged along an inner diameter surface of the outer ring. A slope surface (22*i*) is provided at one or each circumferential end on an inner diameter surface of the outer ring member (22*a*), and a contour line of the slope surface (22*i*) is along a direction perpendicular to a revolution direction of the roller.

8 Claims, 13 Drawing Sheets

ROLLER BEARING, CAMSHAFT SUPPORT STRUCTURE, AND INTERNAL COMBUSTION ENGINE

TECHNICAL FIELD

The present invention relates to a roller bearing to support a camshaft, a crankshaft, a rocker shaft and the like in a car engine, and a camshaft support structure and an internal combustion engine using the roller bearing.

BACKGROUND ART

A conventional bearing to support a camshaft of a car engine is disclosed in Japanese Unexamined Patent Publication No. 2005-180459, for example. Referring to FIG. 21, a camshaft 101 disclosed in the document has a cam lobe 101a, a cylindrical journal part 101b to be supported by a roller bearing 102, and a large-diameter end part 101c.

Here, an outer diameter dimension of the journal part 101b is smaller than a maximum dimension of an outer diameter of the cam lobe 101a and an outer diameter dimension of the large-diameter end part 101c. Therefore, the roller bearing 102 to be arranged at the journal part 101b to support the camshaft 101 rotatably cannot be inserted from an axial direction of the camshaft 101.

Thus, the roller bearing 102 has a plurality of rollers 103, roughly semi-cylindrical retainers 104 and 105 split in a circumferential direction, and roughly semi-cylindrical race plates 106 and 107 arranged between a cylinder head 108 and a cap 109 and split in the circumferential direction.

The race plates 106 and 107 have projections 106a and 107a, respectively each projecting from axial each end face of a circumferential center part toward a radial outer side. Meanwhile, the cylinder head 108 and the cap 109 are provided with recess parts 108a and 109a to receive the projections 106a and 107a of the race plates 106 and 107, respectively. Thus, it is reported that when the projections 106a and 107a engage with the recess parts 108a and 109a, respectively, the circumferential and axial movements of the race plates 106 and 107 are prevented.

In addition, referring to FIG. 22, one circumferential side end of the race plate 106 is a wedge-shaped projection part 106b, and the other circumferential side end thereof is a valley-shaped recess part 106c. In addition, circumferential both ends have been pressed. Thus, it is reported that since a burr generated at the circumferential end due to the punching process is corrected and an end configuration is also corrected, assembling accuracy is improved.

Furthermore, the above race plates 106 and 107 are produced from a steel plate such as cold rolled steel plate (SPC) by a press process in general. In addition, a heat treatment is performed to obtain predetermined characteristics such as hardness, and a grinding process is performed on the inner diameter surface serving as a track surface of the roller 103, so that the roller 103 can rotate smoothly.

According to the above document, although the direction of the press performed on circumferential both ends of the above race plate 106 is not described, it is contemplated that the press process is performed in a direction (shown by arrows in FIG. 22) perpendicular to an outline in view of the purpose to correct the burr and the purpose to correct the end configuration.

However, since the part pressed in the above direction is inclined from the rolling direction of the roller 103 to the left or right, the behavior of the roller 103 could be hindered by the pressed part when the roller 103 passes through an abutment part between the race plates 106 and 107.

In addition, since a load biased in a predetermined direction is applied to the camshaft 101 at the time of rotation, the above camshaft support structure is sectioned to a region to which a relatively high load is applied (referred to as the "load region" hereinafter), and a region to which a relatively low load is applied (referred to as the "non-load region" hereinafter).

Therefore, since the high load is applied to the race plate positioned in the load region, high process accuracy is required in order to maintain the smooth rotation of the roller 103. Meanwhile, since many steps are required to produce the race plate as described above, the production cost of the race plate represents a major proportion of overall production cost of the roller bearing 102. This becomes considerably noticeable especially when high-accuracy process is needed.

DISCLOSURE OF THE INVENTION

Thus, it is an object of the present invention to provide a roller bearing having rollers capable of rotating smoothly, as a bearing to support a camshaft of a car engine and the like. In addition, it is an object of the present invention to provide a camshaft support structure and an internal combustion engine using the above roller bearing as the bearing to support the camshaft.

It is another object of the present invention to provide a highly-reliable camshaft support structure by using a roller bearing in which production cost is low and rollers can rotate smoothly, and an internal combustion engine provided with the above camshaft support structure.

A roller bearing includes an outer ring formed by connecting a plurality of arc-shaped outer ring members in a circumferential direction, and a plurality of rollers arranged along an inner diameter surface of the outer ring. In addition, a slope surface is provided at one or each circumferential end of the outer ring member, and a contour line of the slope surface is along a direction perpendicular to a revolution direction of the roller.

As described above, since the slope surface following the rolling direction is provided at the circumferential end of the outer ring member, the roller can roll smoothly on an abutment part between adjacent outer ring members. In addition, even when the slope surface is provided only at the circumferential end on the side the roller is brought in contact first, the effect of the present invention can be achieved.

Preferably, when it is assumed that a thickness of the thickest part of the outer ring member is $t_0$, and a thickness of the slope surface at the circumferential end is t, a relation $0.05 \leq t/t_0 \leq 0.5$ is satisfied. Further preferably, when it is assumed that an inclination angle of the slope surface is θ, a relation $10° \leq θ \leq 45°$ is satisfied. It is preferable that the thickness of the slope surface and the inclination angle thereof are within the above range in order to achieve the effect of the present invention satisfactorily.

A camshaft support structure according to the present invention includes a camshaft, a housing to house the camshaft, and a roller bearing to rotatably support the camshaft with respect to the housing. The roller bearing includes an outer ring formed by connecting a plurality of arc-shaped outer ring members in a circumferential direction, and a plurality of rollers arranged along an inner diameter surface of the outer ring. In addition, a slope surface is provided at one or each circumferential end of the outer ring member, and a contour line of the slope surface is along a direction perpendicular to a revolution direction of the roller.

Preferably, a track surface positioned on a radial outer side of the plurality of rollers is composed of an inner diameter surface of the outer ring member set in a region of the housing to house the camshaft, and an inner peripheral surface of the housing connected to the circumferential end of the outer ring member.

As described above, since one part of the track surface of the roller is made up of the inner peripheral surface of the housing, the number of components of the roller bearing can be reduced, so that the production cost can be lowered as a whole. As a result, the highly-reliable camshaft support structure can be provided at low cost.

Preferably, the outer ring member is positioned in a region within a load region of the camshaft. Especially, since the outer ring member is arranged at the position within the load region of the camshaft, the smooth rotation of the roller can be maintained.

An internal combustion engine according to the present invention includes a housing, a cylinder provided in the housing, a valve to open and close a supply path and an exhaust path connected to the cylinder, a camshaft to control opening and closing timings of the valve, and a roller bearing to rotatably support the camshaft. The roller bearing includes an outer ring formed by connecting a plurality of arc-shaped outer ring members in a circumferential direction, and a plurality of rollers arranged along an inner diameter surface of the outer ring. In addition, a slope surface is provided at one or each circumferential end of the outer ring member, and a contour line of the slope surface is along a direction perpendicular to a revolution direction of the roller.

When the above roller bearing is used, the highly-reliable camshaft support structure and the internal combustion engine each having a long life can be provided.

According to the present invention, since the slope surface sloping toward the rolling direction is provided at the circumferential end of the outer ring member, the behavior of the roller passing through the abutment part between adjacent outer ring members can be stable. As a result, the roller bearing having the rollers capable of rotating smoothly can be provided. In addition, when the above roller bearing is used, the highly-reliable camshaft support structure and the internal combustion engine each having a long life can be provided.

A camshaft support structure according to the present invention includes a camshaft, a housing to house the camshaft, and a roller bearing to rotatably support the camshaft with respect to the housing. The roller bearing includes an arc-shaped outer ring member and a plurality of rollers, and a track surface positioned on a radial outer side of the plurality of rollers is composed of an inner diameter surface of the outer ring member set in a region of the housing to house the camshaft, and an inner peripheral surface of the housing connected to the circumferential end of the outer ring member.

As described above, since one part of the track surface of the roller is made up of the inner peripheral surface of the housing, the number of components of the roller bearing can be reduced, so that the production cost can be lowered as a whole. As a result, the highly-reliable camshaft support structure can be provided at low cost.

Preferably, the outer ring member is positioned in a region within a load region of the camshaft. Especially, when the outer ring member is arranged at the position within the load region of the camshaft, the smooth rotation of the roller can be maintained.

An internal combustion engine according to the present invention includes a housing, a cylinder provided in the housing, a valve to open and close a supply path and an exhaust path connected to the cylinder, a camshaft to control opening and closing timings of the valve, and a roller bearing to rotatably support the camshaft. The roller bearing includes an arc-shaped outer ring member and a plurality of rollers, and a track surface positioned on a radial outer side of the plurality of rollers is composed of an inner diameter surface of the outer ring member set in a region of the housing to house the camshaft, and an inner peripheral surface of the housing connected to the circumferential end of the outer ring member.

When the above camshaft support structure is used, the highly-reliable internal combustion engine can be provided.

According to the present invention, since the outer ring member is arranged only at the part (load region) required to be highly accurate in the track surface of the roller, and the other part is made up of the inner peripheral surface of the housing, the smooth roller rotation can be maintained while the production cost is reduced. As a result, the highly-reliable camshaft support structure and the internal combustion engine can be provided at low cost.

BEST MODE FOR CARRYING OUT THE INVENTION

Figure 18:
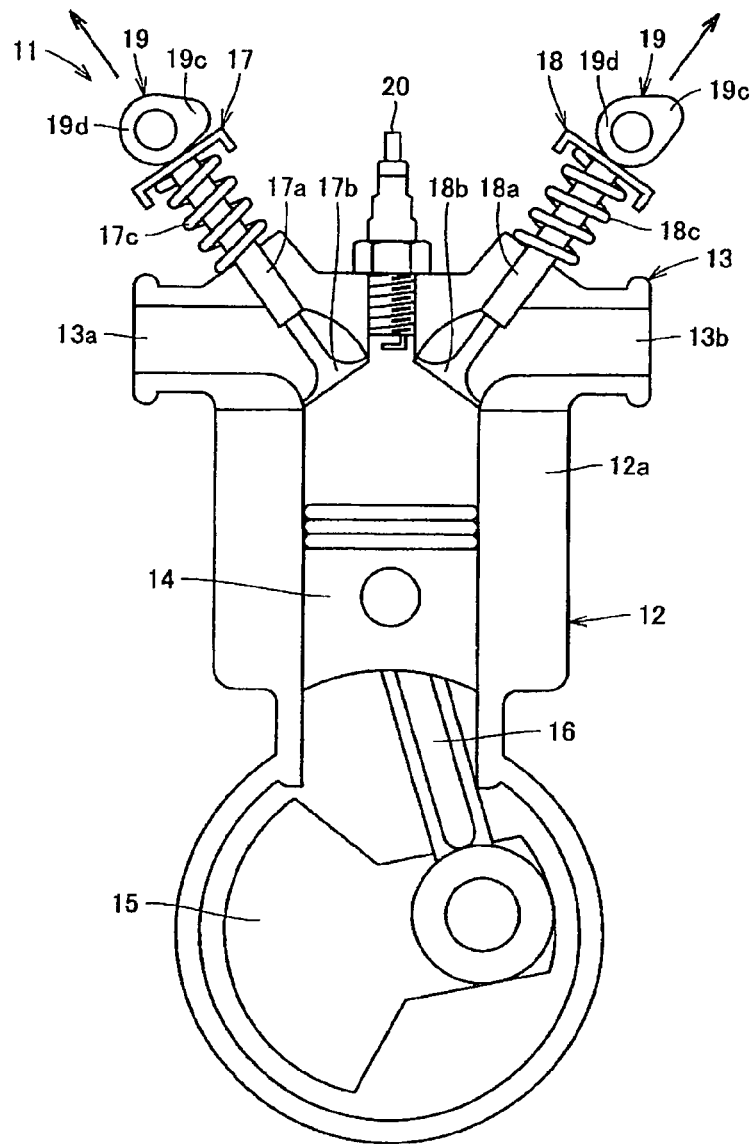
FIG. 18 is a sectional view showing one cylinder of an internal combustion engine according to one embodiment of the present invention.
Figure 19:
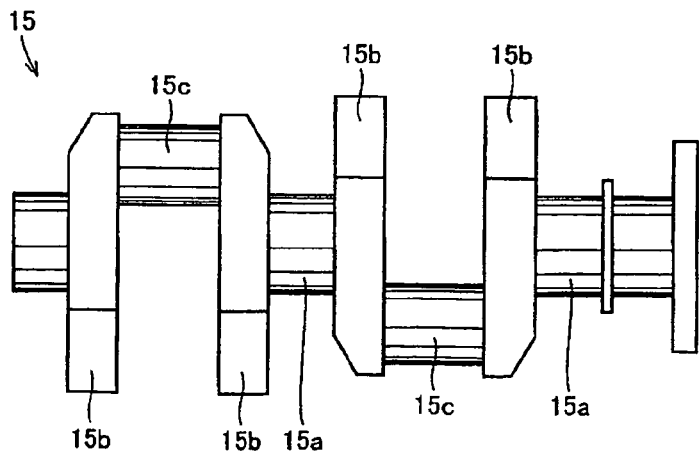
FIG. 19 is a view showing a crankshaft employed in the internal combustion engine in FIG. 18.
Figure 20:
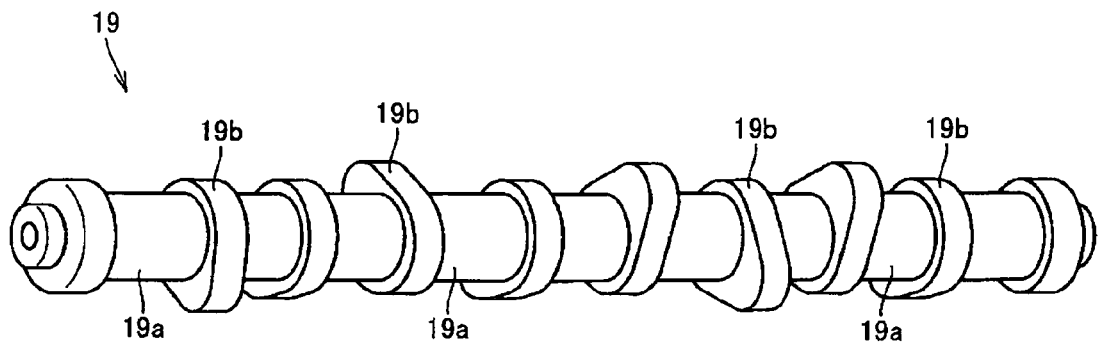
FIG. 20 is a view showing a camshaft employed in the internal combustion engine in FIG. 18.
Figure 21:
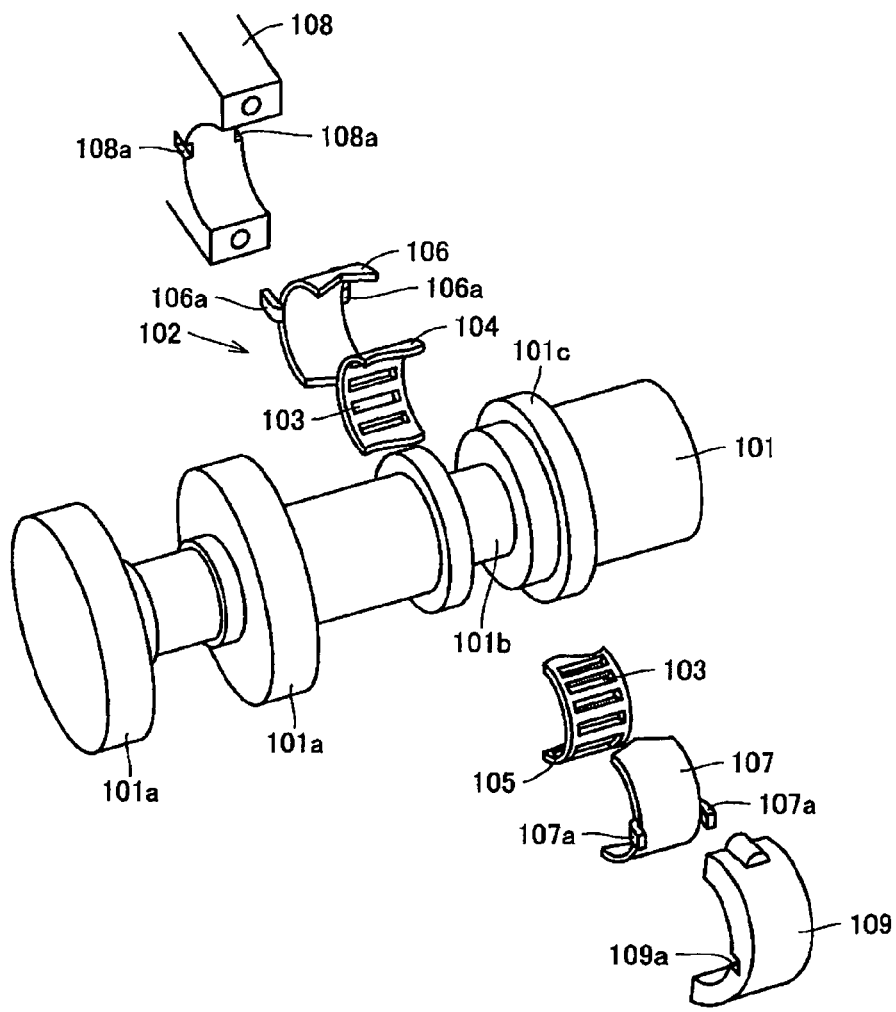
FIG. 21 is a view showing a conventional camshaft support structure.
Figure 22:
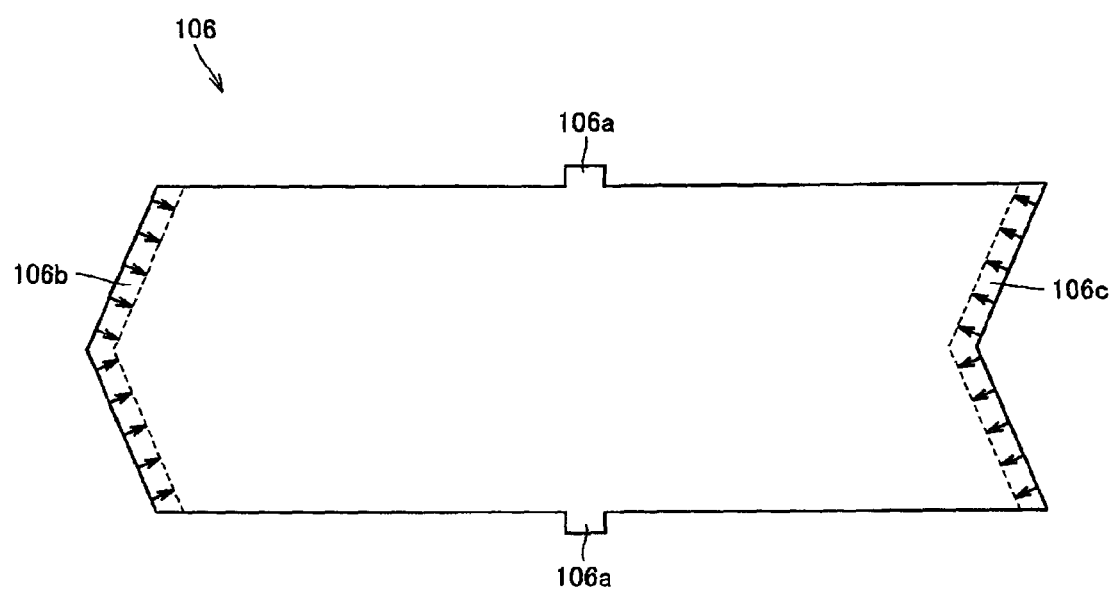
FIG. 22 is an enlarged view showing a race plate of a roller bearing in FIG. 21.

An internal combustion engine 11 according to one embodiment of the present invention will be described with reference to FIGS. 18 to 20 hereinafter. FIG. 18 is a sectional view showing a cylinder of the internal combustion engine 11 according to one embodiment of the present invention, FIG. 19 is a view showing a crankshaft 15 used in the internal combustion engine 11, and FIG. 20 is a view showing a camshaft 19 used in the internal combustion engine 11.

First, referring to FIG. 18, the internal combustion engine 11 is a reciprocal engine having a cylinder block 12 and a cylinder head 13 as housings, a motion conversion mechanism to convert reciprocal motion to rotary motion, a supply and exhaust system to supply an air-fuel mixture and to exhaust a combustion gas, and a spark plug 20 as an ignition device.

The motion conversion mechanism is housed in the cylinder block 12 and includes a piston 14, and reciprocated in a cylinder 12a provided in the cylinder block 12, the crankshaft 15 connected to a transmission (not shown) through a flywheel (not shown) and a clutch (not shown), and a con-rod 16 having one end connected to the piston 14 and the other end connected to the crankshaft 15, to convert the reciprocal motion of the piston to the rotary motion of the crankshaft 15.

The supply and exhaust system includes a supply path 13a and an exhaust path 13b formed in the cylinder head 13 and continued to the cylinder 12a, a supply valve 17 arranged between the cylinder 12a and the supply path 13a, an exhaust valve 18 arranged between the cylinder 12a and the exhaust path 13b, and the camshaft 19 to control the timing of the opening and closing of the supply valve 17 and the exhaust valve 18.

The supply valve 17 includes a valve stem 17a, a valve head 17b provided at one side end of the valve stem 17a, and a valve spring 17c forcing the supply valve 17 to a direction in which the supply path 13a is closed, and the camshaft 19 is connected to the other side end of the valve stem 17a. In addition, since the exhaust valve 18 has the same constitution as that of the supply valve 17, its description will not be reiterated.

Referring to FIG. 19, the crankshaft 15 used in the internal combustion engine 11 includes a shaft part 15a, a crank arm 15b, and a crankpin 15c to arrange the con-rod 16 between the adjacent crank arms 15b. The shaft part 15a of the crankshaft 15 is rotatably supported by a needle roller bearing 21 according to one embodiment of the present invention as will be described below. In addition, the number of the crankpins is the same as the number of the cylinders of the internal combustion engine 11.

Referring to FIG. 20, the camshaft 19 used in the internal combustion engine 11 includes a shaft part 19a and a plurality of cams 19b. The shaft part 19a is rotatably supported by the needle roller bearing 21 according to one embodiment of the present invention as will be described below. The camshaft 19 is connected to the crankshaft 15 by a timing belt (not shown), and rotated according to the rotation of the crankshaft 15.

Since the cam 19b is connected to the supply valve 17 or the exhaust valve 18, the same number is provided as the valves 17 and 18. In addition, as shown in FIG. 18, the cam 19b includes a relatively long diameter part 19c, and a relatively short diameter part 19d, and as shown in FIG. 20, the plurality of cams 19b are arranged in such a way that the positions of the long diameter parts 19c are shifted in a circumferential direction. Thus, the valves 17 and 18 connected to each of the plurality of cams 19b can be opened and closed at different timings.

In addition, the internal combustion engine 11 is a DOHC (Double Over Head Camshaft) engine in which the camshafts 19 are arranged on the upper side of the cylinder head 13 and provided each side of the supply valve 17 and the exhaust valve 18.

Next, an operating principle of the internal combustion engine will be described.

First, the internal combustion engine 11 is a four-cycle engine having four steps such as a supply step, a compression step, a combustion step, and an exhaust step when it is assumed that a step in which the piston 14 is moved between the highest position (top dead point) and the lowest position (bottom dead point) in the cylinder 12a is one step.

In the supply step, the piston 14 is moved from the top dead point to the bottom dead point while the supply valve 17 is open and the exhaust valve 18 is closed. Thus, since the volume of the inside of the cylinder 12a (that designates an upper space of the piston 14 hereinafter) is increased and the pressure therein is lowered, the air-fuel mixture is introduced from the supply path 13a to the inside of the cylinder 12a. Here, the air-fuel mixture is a mixture of air (oxygen) and a misty gas.

In the compression step, the piston 14 is moved from the bottom dead point to the top dead point while the supply valve 17 and the exhaust valve 18 are open. Thus, the volume of the inside of the cylinder 12a is decreased and the pressure therein is raised.

In the combustion step, the spark plug 20 is ignited while the supply valve 17 and the exhaust valve 18 are closed. Thus, the air-fuel mixture in the compressed state is burned and expanded abruptly to push down the piston 14 from the top dead point to the bottom dead point. This force is transferred to the crankshaft 15 through the con-rod 16 as the rotary motion, whereby drive force is generated.

In the exhaust step, the piston 14 is moved from the bottom dead point to the top dead point while the supply valve 17 is closed and the exhaust valve 18 is open. Thus, the volume of the inside of the cylinder 12a is reduced and the combustion gas is discharged to the exhaust path 13b. In addition, after the piston 14 reaches the top dead point in this step, the process returns to the supply step.

In addition, in the above steps, the state in which the supply valve 17 is open means that the long diameter part 19c of the cam 19b abuts on the supply valve 17, and the supply valve 17 is pushed downward against the force of the valve spring 17c, and the state in which the supply valve 17 is closed means that the short diameter part 19d of the cam 19b abuts on the supply valve 17, and the supply valve is pushed upward by the restoring force of the valve spring 17c. In addition, since the same is true as for the exhaust valve 18, its description will not be reiterated.

Among the above steps, the drive force is generated only in the combustion step, and in the other steps, the piston 14 is reciprocated by the drive force generated in the other cylinder.

Therefore, it is desired that the combustion steps are shifted in terms of time by the plurality of cylinders to maintain the smooth rotation of the crankshaft 15.

Figure 1:
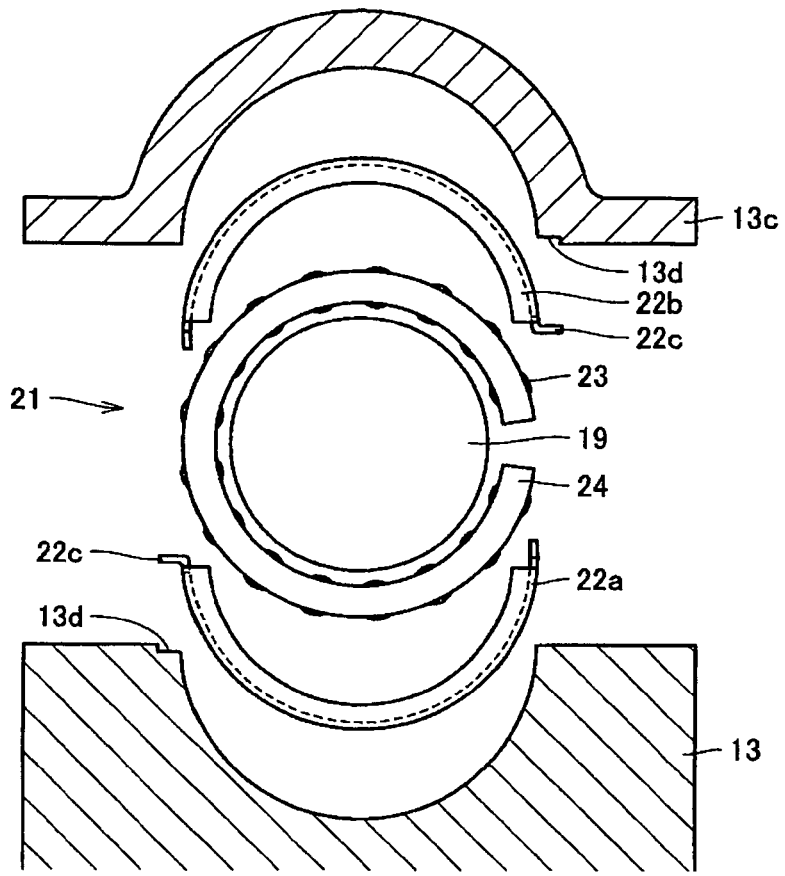
FIG. 1 is a view showing a state before assembling of a camshaft support structure according to one embodiment of the present invention.
Figure 7:
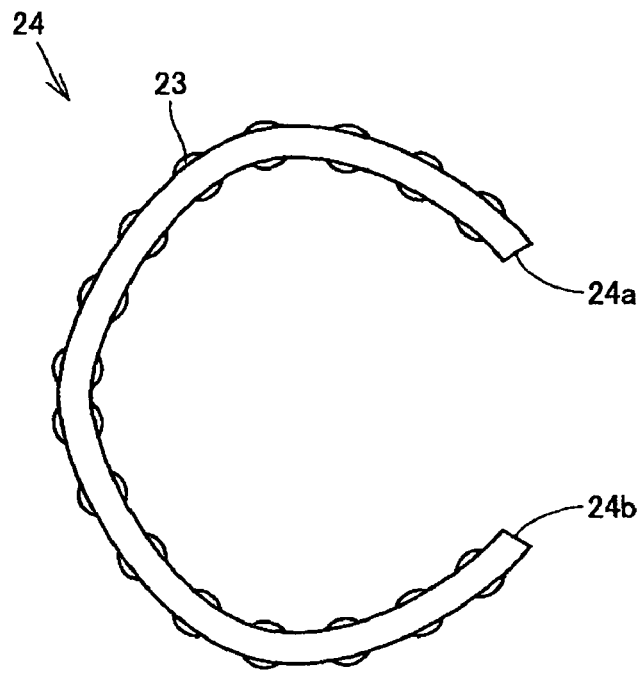
FIG. 7 is a side view showing a retainer of the roller bearing according to one embodiment of the present invention.
Figure 8:
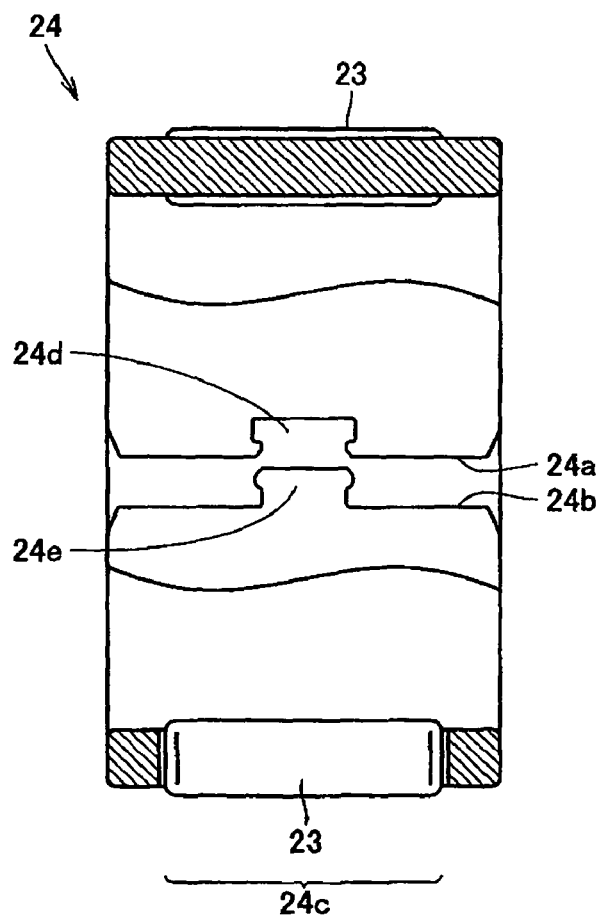
FIG. 8 is a partial sectional view showing a split part of the retainer in FIG. 7.
Figure 9:
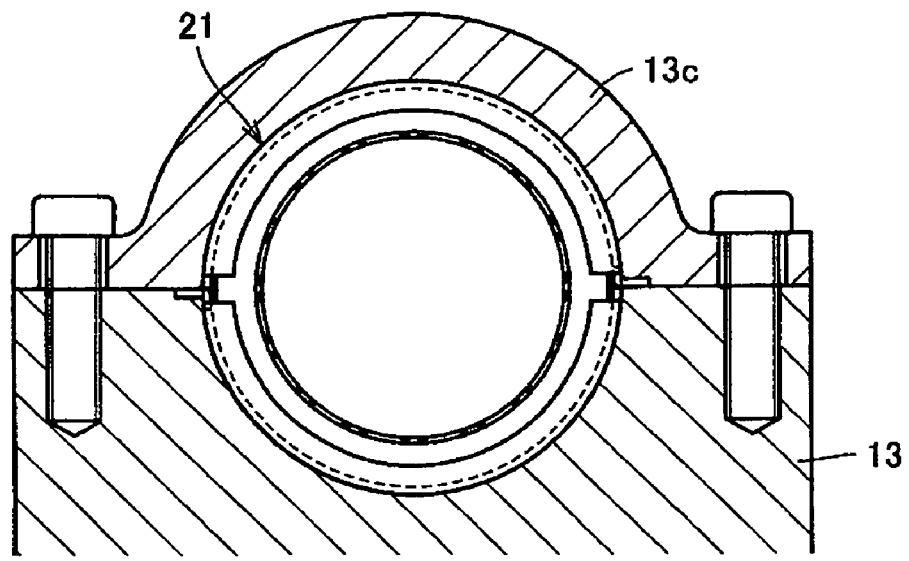
FIG. 9 is a sectional view showing a state after the assembling of the camshaft support structure in FIG. 1 taken from an axial direction.
Figure 10:
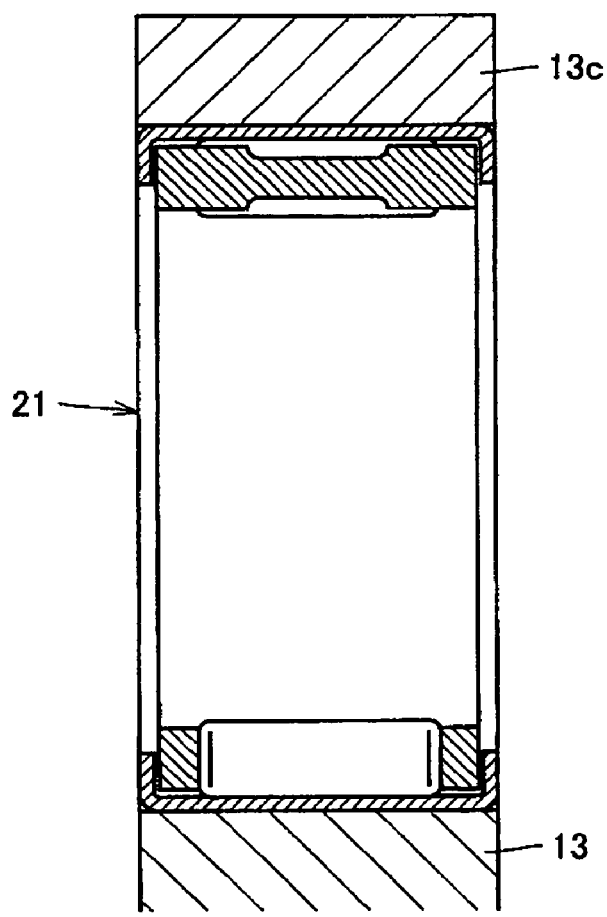
FIG. 10 is a sectional view showing a state after the assembling of the camshaft support structure in FIG. 1 taken from a radial direction.

With reference to FIGS. 1 to 10, a description will be made of the needle roller bearing 21 according to one embodiment of the present invention, and a camshaft support structure in which the needle roller bearing 21 is used. In addition, FIGS. 1, 9 and 10 are views showing states before and after assembly of the camshaft support structure according to one embodiment of the present invention, and FIGS. 2 to 8 are views showing components of the needle roller bearing 21 according to one embodiment of the present invention.

First, referring to FIG. 1, the camshaft support structure according to one embodiment of the present invention includes the camshaft 19, the cylinder head 13 and a bearing cap 13c to house the camshaft 19 as housings, and the needle roller bearing 21 rotatably supporting the camshaft 19 with respect to the housing.

The needle roller bearing 21 includes an outer ring 22 formed by connecting arc-shaped outer ring members 22a and 22b in the circumferential direction, needle rollers 23 arranged along an inner diameter surface of the outer ring 22, and a retainer 24 having a split line extending in an axial direction of the bearing, at one part on the circumference to retain the intervals of the needle rollers 23.

In addition, as the bearing to support the camshaft 19, the needle roller bearing 21 is employed in general. According to the needle roller bearing 21, since the needle roller 23 is linearly in contact with a track surface, it has the advantage of being able to provide high load capacity and high rigidity while a bearing projected area is small. Therefore, according to the needle roller bearing 21, while the load capacity is highly maintained, a radial thickness dimension of a supporting part can be reduced.

Figure 2:
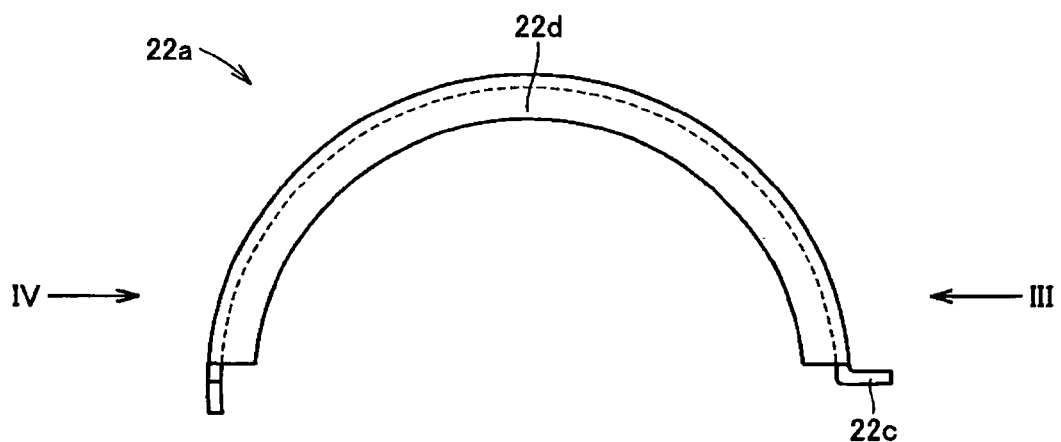
FIG. 2 is a view showing an outer ring member of a roller bearing according to one embodiment of the present invention.
Figure 3:
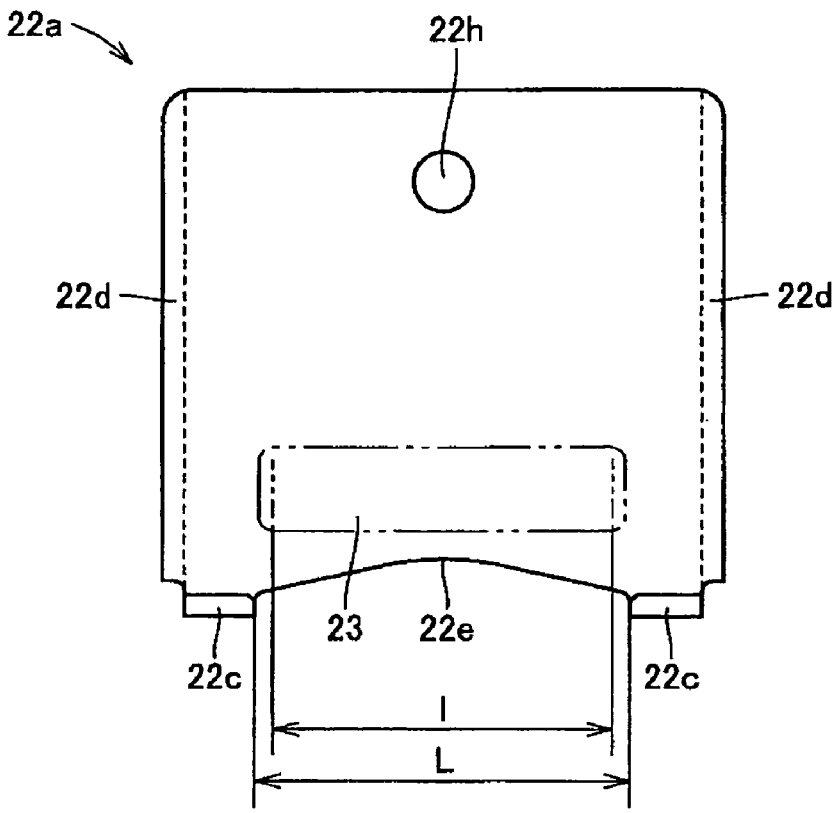
FIG. 3 is a view taken from an III direction in FIG. 2.
Figure 4:
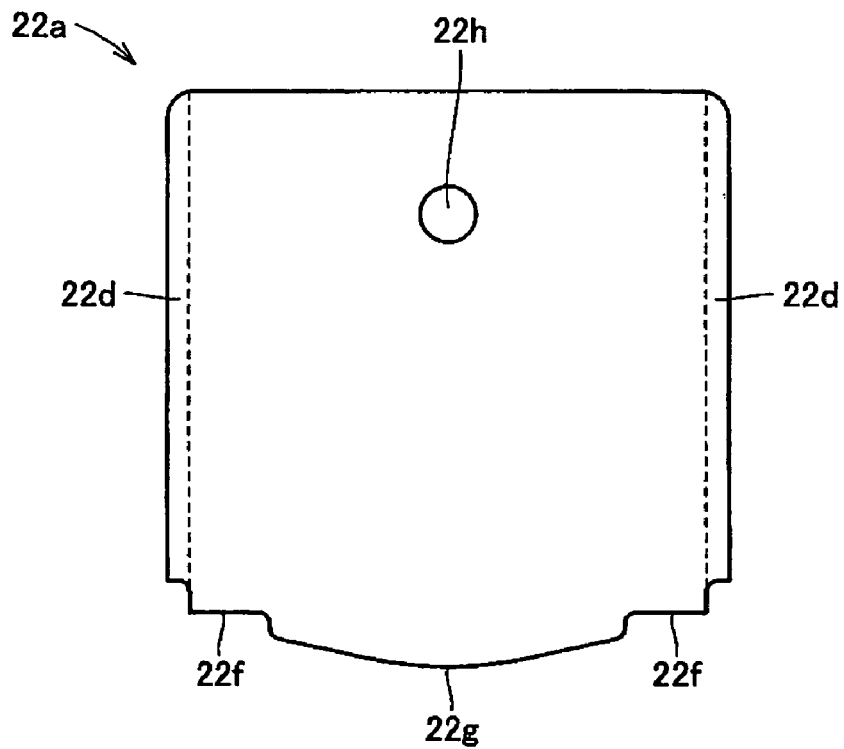
FIG. 4 is a view taken from an IV direction in FIG. 2.
Figure 5:
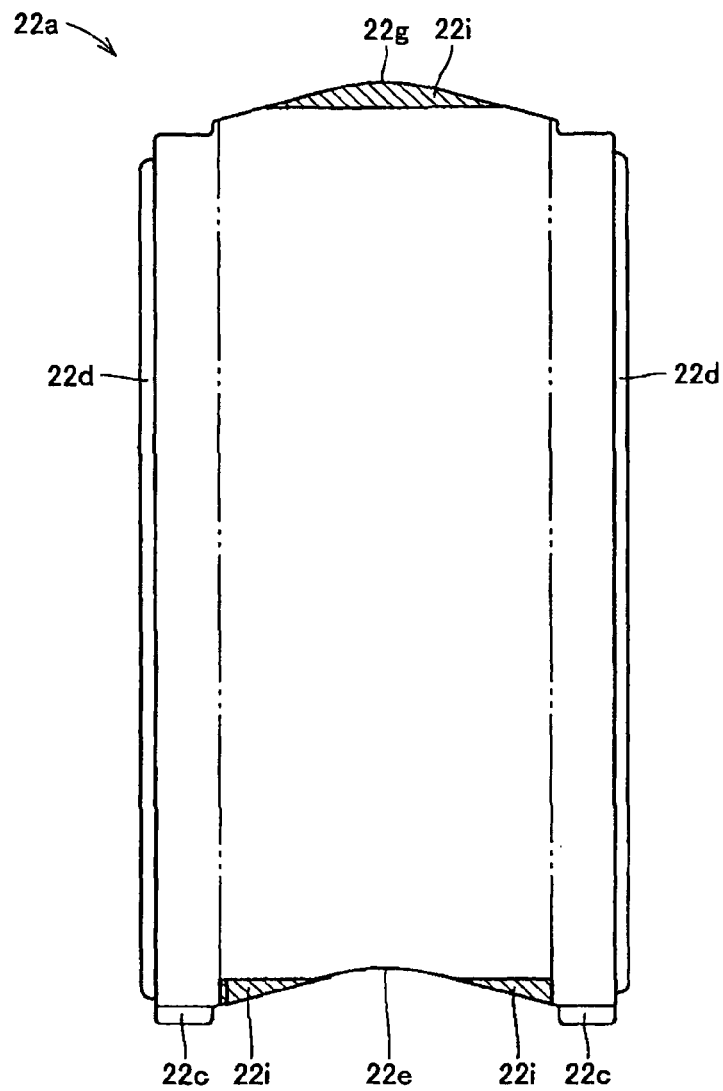
FIG. 5 is a view showing an inner diameter surface of the outer ring member in FIG. 2.
Figure 6:
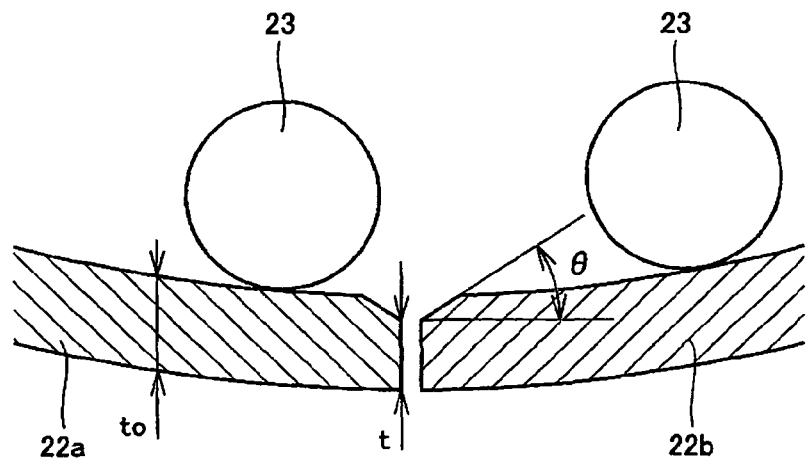
FIG. 6 is an enlarged view showing an abutment part when the outer ring members in FIG. 2 abut on each other.

The outer ring member 22a will be described with reference to FIGS. 2 to 6. In addition, FIG. 2 is a side view of the outer ring member 22a, FIG. 3 is a view taken from an II direction in FIG. 2, FIG. 4 is a view taken from an IV direction in FIG. 4, FIG. 5 is a view showing the outer ring member 22a taken from an inner diameter surface, and FIG. 6 is a view showing an abutment part of the outer ring members 22a and 22b. In addition, since the outer ring member 22b has the same configuration as that of the outer ring member 22a, its description will not be reiterated.

First, referring to FIG. 2, the outer ring member 22a is in the form of a semicircular shape having a center angle of 180° and has an engagement claw 22c provided at one circumferential side end and bent outward in a radial direction, and a flange part 22d projecting from axial each end to the radial inner side. The engagement claw 22c engages with the cylinder head 13 to prevent the outer ring member 22a from rotating with respect to the housing. The flange part 22d regulates the axial movement of the retainer 24, and improves the lubricant oil retention property of the bearing. Thus, the two outer ring members 22a and 22b are connected in the circumferential direction to form the annular-shaped outer ring 22. In addition, the axial center of the inner diameter surface of the outer ring 22 functions as the track surface of the needle rollers 23.

In addition, referring to FIG. 3, the two engagement claws are provided at axial both ends of the circumferential one side end of the outer ring member 22a, and a roughly V-shaped recess part 22e recessed in the circumferential direction is formed between the two engagement claws 22c. In addition, the two engagement claws 22c are provided at axial both ends so as to skirt around the axial center serving as the track surface in the outer ring member 22a, and arranged on a straight line parallel to the rotation axis of the needle roller bearing 21. More specifically, a length L between the two engagement claws 22c is set so as to be longer than an effective length l of the roller 23. In addition, the "effective length of the roller" in this specification designates a length provided by subtracting chamfered parts on both ends from a roller length.

In addition, referring to FIG. 4, the circumferential other side end of the outer ring member 22a is provided with two flat parts 22f each having the same width as the axial width of the engagement claw 22c and provided at axial both ends, and a roughly V-shaped projection part 22g having an arc-shaped tip end and projecting in the circumferential direction and provided between the two flat parts 22f. In addition, the recess part 22e receives the projection part 22g of the adjacent outer ring member when the outer ring members 22a and 22b are connected in the circumferential direction. Thus, since the configuration of the abutment part is roughly V shape, the rotation of the needle rollers 23 can be smooth. In addition, as the configuration of the abutment part of the outer ring members 22a and 22b is not limited to the roughly V shape, it may be any shape, roughly W shape, for example so that the needle roller 23 can rotate smoothly.

In addition, referring to FIGS. 3 and 4, an oil hole 22h penetrating from the outer diameter side to the inner diameter side is provided in the outer ring member 22a. The oil hole 22h is provided at a position so as to be opposed to an oil path (not shown) provided in the housing to supply the lubricant oil into the needle roller bearing 21. In addition, the size, position, and number of the oil hole 22h depend on the size, position, and number of the oil path provided in the housing.

In addition, referring to FIG. 5, a slope surface 22i (shaded area in FIG. 5) is provided at circumferential each end on the inner diameter surface of the outer ring member 22a, and a contour line of the slope surface 22i is along a direction perpendicular to the revolution direction of the needle roller 23. Thus, since the slope surfaces 22i sloping along the rolling direction of the needle roller 23 are provided at the circumferential each end of the outer ring members 22a and 22b, the rotation of the needle roller 23 passing through the abutment part of the adjacent outer ring members 22a and 22b can be smooth.

In addition, according to this embodiment, the slope surface 22i provided on the side in which the projection part 22g is formed (upper side in FIG. 5) is formed in the axial center, that is, in the tip end of the projection part 22g. Meanwhile, the slope surface 22i provided on the side in which the recess part 22e is formed (lower side in FIG. 5) is formed at axial each end, that is, on each side of the recess part 22e.

Furthermore, referring to FIG. 6, the slope surface 22i is a tapered surface inclined at a predetermined inclination angle of θ from the circumferential end to the circumferential center. A thickness is smallest at the circumferential end (t), and a thickness in the circumferential center, that is, the part between the two slope surfaces 22i is constant ($t_0$). Here, it is preferable that $0.05 \leq t/t_0 \leq 0.5$ and $10° \leq θ \leq 45°$ in order to achieve a sufficient effect of the present invention. In addition, the "inclination angle of θ" designates an angle formed between a straight line perpendicular to the circumferential end face and the slope surface of the outer ring member 22a.

When the thickness has a relation such that $t_0/t<0.05$, the needle roller passing through the abutment part of the adjacent outer ring members 22a and 22b hits the corner formed at the circumferential end and the behavior of the needle roller 2 is hindered and the rolling surface thereof is damaged. Meanwhile, when the thickness has a relation such that $t_0/t>0.5$, the needle roller 23 is fit in the groove formed at the abutment part of the outer ring members 22a and 22b and the smooth rotation of the needle roller bearing 21 is hindered.

When the inclination angle has a relation such that θ<10°, since the thickness $t_0$ has to be reduced to some extent to achieve the sufficient effect of the present invention, the circumferential length of the slope surface 22i is increased as a result, which causes the strengths of the outer ring members 22a and 22b to be lowered. Meanwhile, when the inclination angle is such that θ>45°, the needle roller 23 hits the corner part formed at an end point of the slope surface 22i (circumferential center side), so that the behavior of the needle roller 23 is hindered and the rolling surface thereof is damaged. Thus, it is desirable to set the thickness and the inclination angle within the above range to avoid the above troubles.

Next, the retainer 24 will be described with reference to FIGS. 7 and 8. FIG. 7 is a side view showing the retainer 24, and FIG. 8 is a partial sectional view showing the split part of the retainer 24. The retainer 24 has a roughly C-shaped configuration in which the split line extends in the axial direction of the bearing, at one part on the circumference, and pockets 24c for housing the needle rollers 23 are provided at regular intervals in the circumferential direction. In addition, the retainer 24 is molded by injecting a resin material.

In addition, a recess part 24d is provided at a cut end face 24a on circumferential one side of the split part, and a projection part 24e is provided at a cut end face 24b on the other side so as to correspond to the recess part 24d, and the annular-shaped retainer 24 can be formed by engaging the recess part 24d with the projection part 24e. In addition, according to this embodiment, a width of a tip end part of the projection part 24e is larger than that of a root part thereof, and a width of a front part of an opening of the recess part 24d is smaller than that of a back part thereof. Thus, the engagement of the recess part 24d and the projection part 24e are ensured.

Next, a description will be made of procedures when the needle roller bearing 21 is assembled in the camshaft 19 with reference to FIGS. 1, 9 and 10.

First, the needle rollers 23 are set in the pockets 24c of the retainer 24. Then, the split part is enlarged by use of elasticity thereof and the retainer 24 is assembled in the camshaft 19. Then, the retainer 24 is fixed by engaging the recess part 24d with the projection part 24e.

Then, the one outer ring member 22a, the camshaft 19 around which the retainer 24 is wound and fixed, the other outer ring member 22b, and the bearing cap 13c are assembled in the cylinder head 13 in this order and the cylinder head 13 and the bearing cap 13c are fixed by fastening a bolt. At this time, the recess part 22e of the outer ring member 22a and the projection part 22g of the outer ring member 22b, and the projection part 22g of the outer ring member 22a and the recess part 22e of the outer ring member 22b are arranged so as to engage with each other.

In addition, the engagement claw 22c of the outer ring member 22a is arranged so as to engage with an engagement groove 13d provided at the abutment surface of the cylinder head 13 and the bearing cap 13c, and the engagement claw 22c of the outer ring member 22b is arranged so as to engage with an engagement groove 13d provided at the abutment surface of the bearing cap 13c and the cylinder head 13. Thus, the outer ring members 22a and 22b can be prevented from rotating in the housing during the rotation of the bearing.

Although the case where the needle roller bearing 21 is employed as the bearing to support the camshaft 19 is shown in the above embodiment, the present invention can be applied to other roller bearings such as a cylindrical roller bearing and a long roller bearing.

In addition, although the needle roller bearing 21 has the outer ring 22, the needle rollers 23, and the retainer 24 in the above embodiment, the bearing may be a full complement roller bearing in which the retainer 24 is not provided.

In addition, the slope surface 22i according to the above embodiment has the tapered surface having the inclination angle of θ in the above embodiment, and it may have any configuration. For example, it may be a curved projection surface.

In addition, although the slope surface 22i in the above embodiment may be provided an entire area of the width of the track surface (region surrounded by two-dot chain lines in FIG. 5), it may be provided at a part of the width of the track surface like in this embodiment. In this case, the effect of the present invention can be achieved as long as the slope surface 22i is provided at the part with which the needle roller 23 is brought in contact first when passing through the abutment part of the adjacent outer ring members 22a and 22b, that is, at the shaded area in FIG. 5.

In addition, although the outer ring 22 is split into the outer ring members 22a and 22b in the circumferential direction in the above embodiment, it may be split into any number. For example, three outer ring members having a center angle of 120° may be connected to form an outer ring. Furthermore, a plurality of outer ring members having different center angles may be combined to form an outer ring. Similarly, the retainer 24 may have any configuration.

In addition, although the retainer 24 according to this embodiment is formed of the resin to obtain high production efficiency and high elastic deformability, the retainer may be a cut retainer produced by a cutting process or a pressed retainer produced by pressing a steel plate.

In addition, the needle roller bearing 21 according to the above embodiment is not only used as the bearing to support the camshaft 19 but also widely used as a bearing to support the shaft part 15a of the crankshaft 15 shown in FIG. 19 and a rocker shaft.

Still furthermore, although the present invention can be applied to a single-cylinder internal combustion engine, it is preferably used as the bearing to support the part in which the needle roller bearing 21 cannot be inserted in the axial direction, like the shaft part 15a of the crankshaft 15 shown in FIG. 19 and the shaft part 19b of the camshaft 19 shown in FIG. 20 used in a multicylinder engine.

In addition, although the present invention is applied to the outer ring members 22a and 22b each having the engagement claw 22c at the circumferential end to engage with the housing, and the flange part 22d to regulate the axial movement of the retainer at axial each end in the above embodiment, the engagement claw 22c and the flange part 22d are not indispensable components in the present invention, so that the present invention can be applied to an outer ring member having any configuration.

Figure 11:
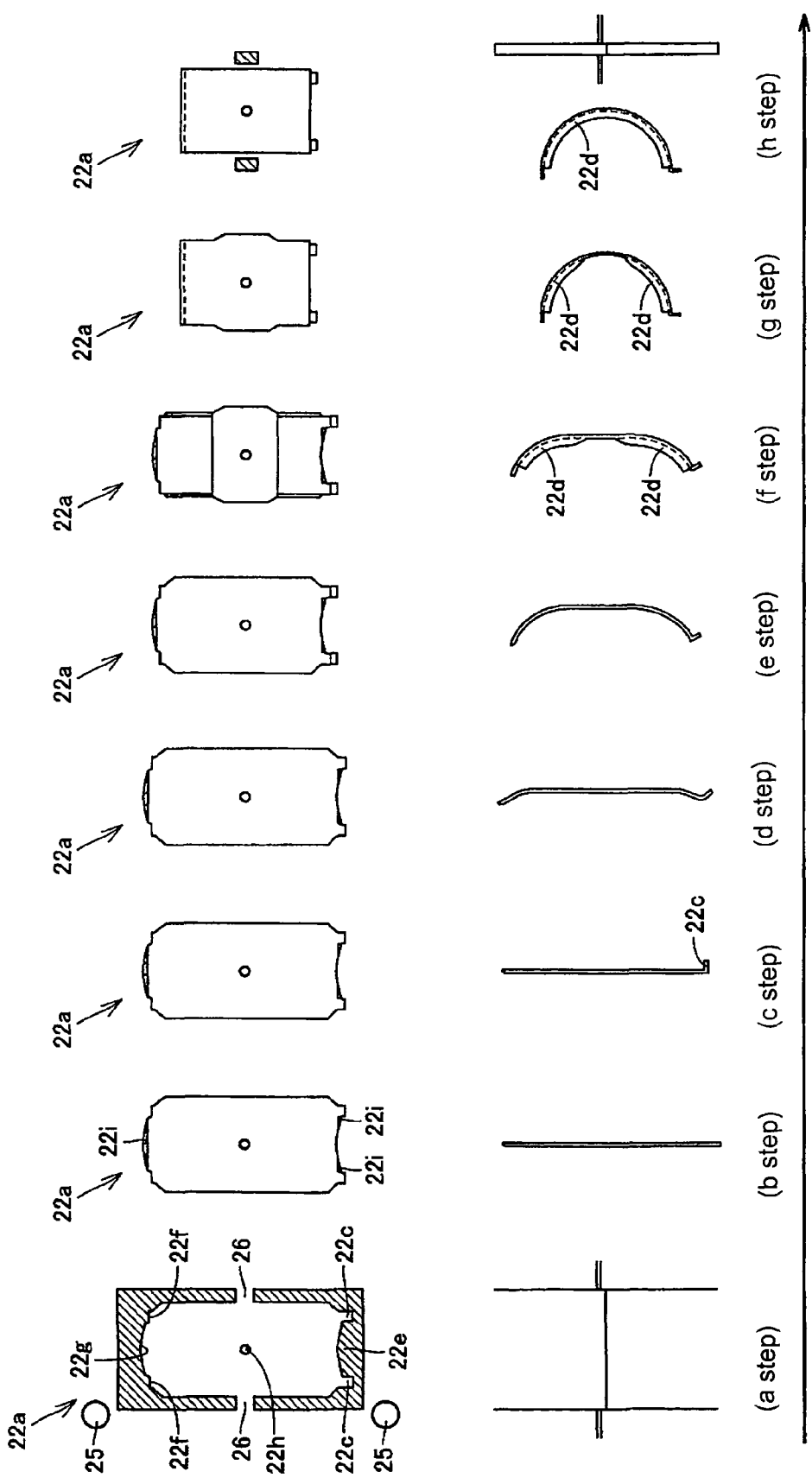
FIG. 11 is views showing a part of a production process of the outer ring member according to one embodiment of the present invention in which an upper part is a plan view and a lower part is a sectional view.

Next, a production method of the outer ring member 22a according to one embodiment of the present invention will be described with reference to FIG. 11. FIG. 11 is a view showing a part of the production process of the outer ring member 22a, in which an upper part shows a plan view and a lower part shows a sectional view. In addition, the production method of the outer ring member 22b is the same as that of the outer ring member 22a, its description will not be reiterated.

First, as a starting material, carbon steel containing 0.15 wt. % to 1.1 wt. % of carbon is used. More specifically, SCM415 and S50C containing 0.15 wt. % to 0.5 wt. % of carbon, or SAE1070 and SK5 containing 0.5 wt. % to 1.1 wt. % of carbon are used.

In addition, when carbon steel containing less than 0.15 wt. % of carbon is used, since a carburized layer is not likely to be formed, it is necessary to perform a nitrocarburizing process to obtain hardness required in the outer ring member 22a. According to the nitrocarburizing process, since facility cost is high as compared with a quenching process as will be described below, production cost of the needle roller bearing 21 is increased as a result. In addition, when the carbon steel containing less than 0.15 wt. % of carbon is used, a satisfactory carburized layer is not provided even by the nitrocarburizing process in some cases, so that surface-originated flaking could be generated in an early stage. Meanwhile, when carbon steel containing more than 1.1 wt. % of carbon is used, since processability is considerably lowered, the problem is that the process precision is lowered and production cost is increased due to an increase in number of processes.

Referring to FIG. 11, an outline of the outer ring member 22a is formed by a punching process from a steel plate as a first step (a step). In addition, the parts to be the recess part 22e and the engagement claw 22c are formed at the longitudinal one side end, and the parts to be the flat part 22f and the projection part 22g are formed at the other side end. Furthermore, the oil hole 22h may be formed at the same time when the outline is formed.

At this time, a longitudinal length of the outer ring member 22a is determined based on a diameter of the camshaft 19, and a lateral length thereof is determined based on the roller length of the needle roller 23 to be used. Here, it is to be noted that the lateral length in this step is longer than the axial width dimension of the completed outer ring member 22a because the part to be the flange part 22d is contained in the lateral width.

In this step, all the parts may be punched out at one time, or the plurality of punching processes may be repeated to provide the predetermined configuration. In addition, when a progressive press is used, a pilot hole 25 to determine a process position in each process step is to be provided and a connection part 26 is to be provided between the adjacent outer ring members.

As a second step, the slope surface 22i is formed on the circumferential end of the outer ring member 22a by pressing process (b step).

As a third step, the circumferential end of the outer ring member 22a is bent outward in the radial direction by a bending process, to form the engagement claw 22c (c step). A bending angle of the engagement claw 22c is to follow the engagement groove 13c of the housing. In addition, according to this embodiment, the engagement claw 22c is bent at an angle of 90° with respect to the outer ring member 22a.

A fourth step is composed of a step of bending the outline of the outer ring member 22a such that it has a predetermined curvature by a bending process, and a step of forming the flange part 22d such that it projects from axial each end to the radial inner side in the outer ring member 22a (d step to h step). More specifically, the bending process is performed from the longitudinal both ends gradually without bending the center part containing the connection part 26 (d step and e step). Then, a bending process is performed on lateral each end to form the flange part 22d with respect to the longitudinal both ends on which the bending process has been processed (f step). Then, the bending process is performed also on the longitudinal center part to cause the predetermined curvature in the outline of the outer ring member 22a (g step). Finally, the connection part 26 is removed and the flange part 22d is formed in the longitudinal center part (h step).

After the above pressing process steps, a heat treatment is performed to obtain predetermined mechanical characteristics such as hardness required for the outer ring member 22a. In addition, a surface hardness Hv of the inner diameter surface of the outer ring member 22a functioning as the track ring needs to be 635 or more.

In order to obtain a hardened layer having a sufficient depth in the outer ring member 22a, it is necessary to select an appropriate heat treatment method based on the carbon content of the starting material. More specifically, when the carbon content is 0.15 wt. % to 0.5 wt. %, a carburizing quenching process is performed, and when the carbon content is 0.5 wt. % to 1.1 wt. %, a bright quenching process or a high-frequency quenching process is performed.

The carburizing quenching process is a heat treatment method using a phenomenon in which carbon is soluble in steel under high temperature condition, so that a surface layer (carburized hardened layer) has a large amount of carbon while the inside of steel has a small amount of carbon. Thus, it is characterized in that the surface is hard and the inside is soft and high in toughness. In addition, its facility cost is low as compared with that of the nitrocarburizing process.

The bright quenching process is a quenching process performed in a protective atmosphere or vacuum to prevent oxidization of the steel surface. In addition, its facility cost is low as compared with those of the nitrocarburizing process and the carburizing quenching process.

A high-frequency quenching process is a method for forming a quenched hardened layer by heating the steel surface rapidly and cooling it rapidly by use of a principle of induction heating. Its facility cost is considerably low as compared with those of the above processes and it has a merit of being environment-friendly because gas is not used in a heat treatment process. In addition, it has the advantage in that the quenching process can be partially performed.

Furthermore, it is preferably to perform a tempering process after the above quenching process to reduce residual stress and internal distortion generated in the quenching process and to improve the toughness and to stabilize the dimension.

In addition, although the step of forming the curvature of the outline of the outer ring member 22a and the step of forming the flange part 22d are performed in parallel in the above embodiment, the step of forming the curvature of the outline and the step of forming the flange part 22d may be performed separately.

Furthermore, the above first to fourth steps are only one example of the production method of the outer ring member in the present invention, so that each step may be further segmented or a necessary step may be further added. In addition, the order of the process steps can be exchanged optionally.

Furthermore, although the above steps (a step to h step) may be performed separately by a single purpose press, they may be performed by a progressive press or a transfer press. Thus, each step can be sequentially performed. In addition, when a production machine of the outer ring member 22a having all or a part of the above steps (a step to h step) is used, productivity can be enhanced and the production cost of the needle roller bearing 21 can be lowered as a result.

In addition, the "progressive press" in this specification designates a method for processing a material sequentially by moving the material through a plurality of process steps in the press by a feeder provided at a press inlet. In addition, the "transfer press" in this specification designates a method for processing a material at each of stages provided as many as needed to perform the process steps while the material is moved by a transfer device when the plurality of process steps are needed.

Figure 14:
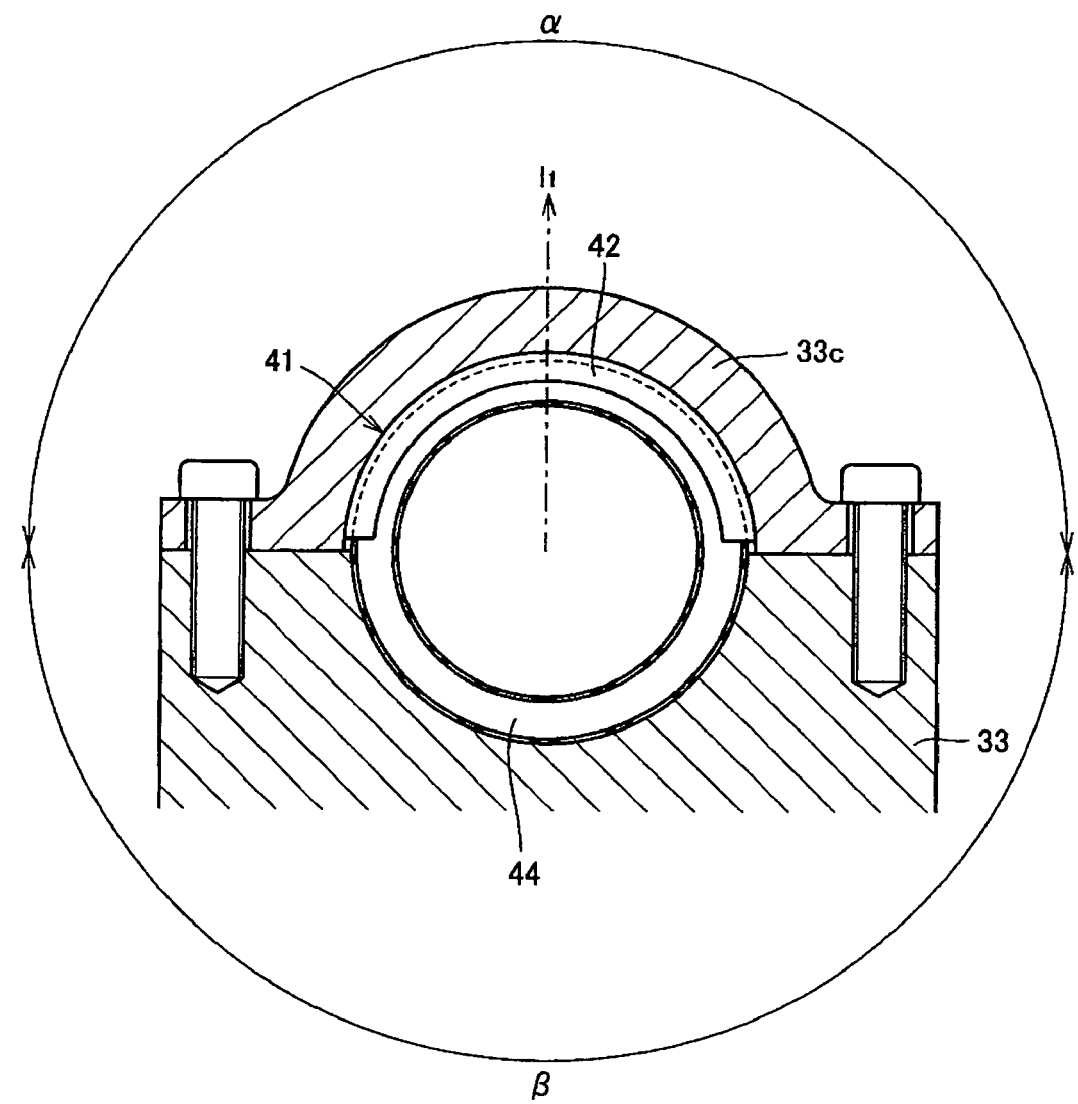
FIG. 14 is a sectional view showing a state after assembling of the camshaft support structure in FIG. 12 taken from an axial direction.
Figure 15:
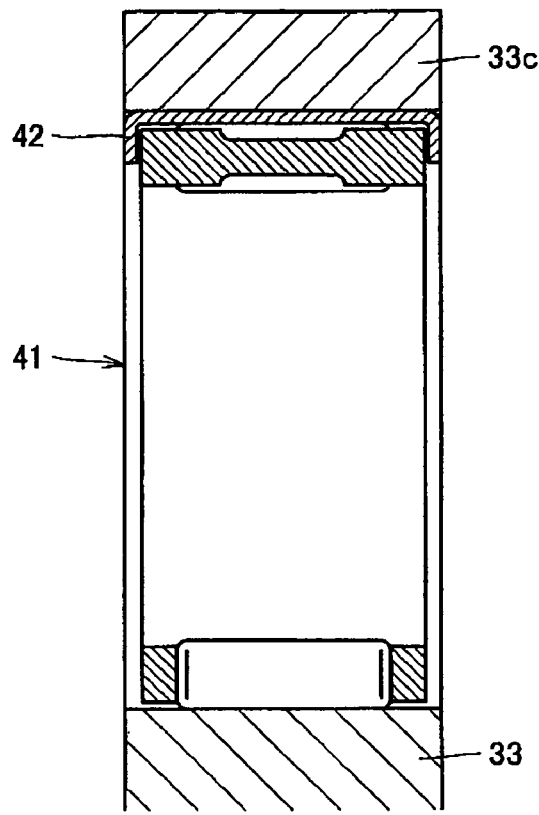
FIG. 15 is a sectional view showing a state after assembling of the camshaft support structure in FIG. 12 taken from a radial direction.

A description will be made of a needle roller bearing 41 as a bearing according to another embodiment of the present invention, and a camshaft support structure using the needle roller bearing 41 with reference to FIGS. 12 to 15. In addition, since the basic constitution of the needle roller bearing 41 is the same as that of the needle roller bearing 21, the same part will not described but a different point will be described mainly. In addition, FIGS. 12, 14, and 15 are views showing the states before and after the camshaft support structure is assembled, and FIG. 13 is a view showing an outer ring member 42.

Figure 12:
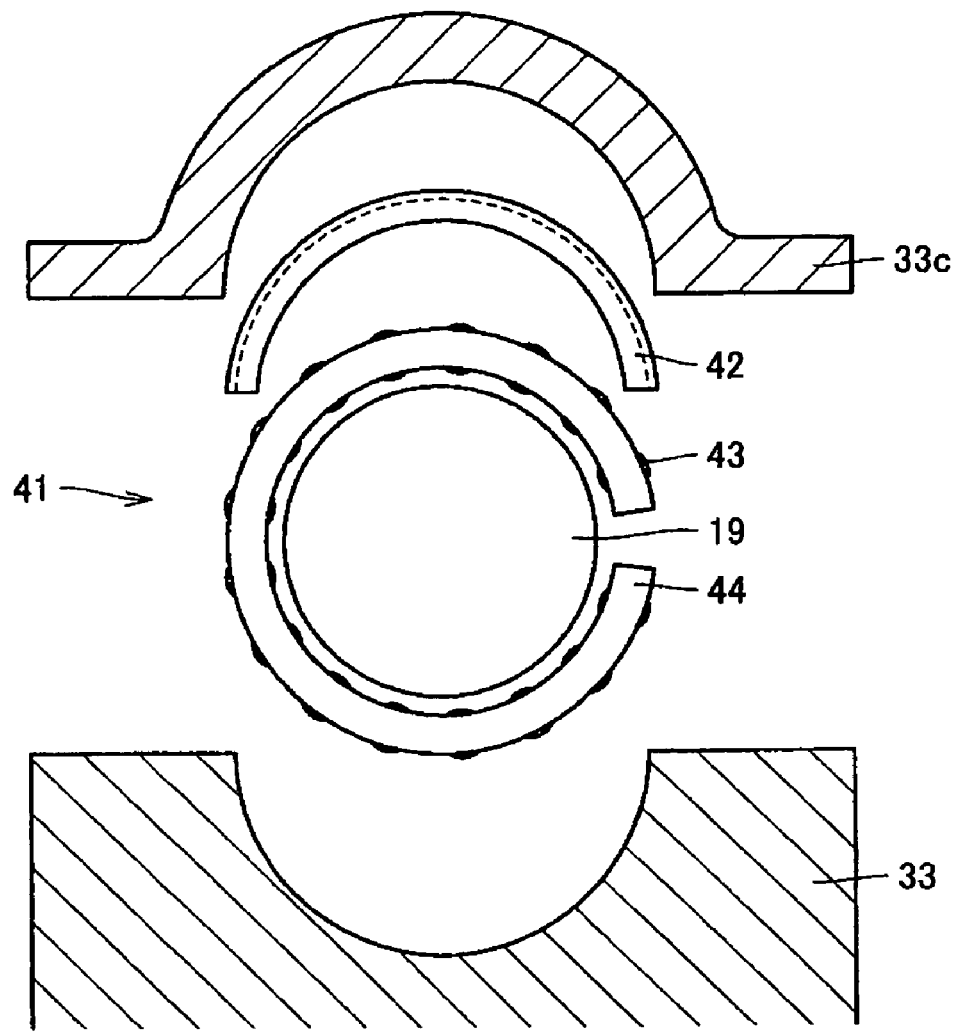
FIG. 12 is a view showing a state before assembling of a camshaft support structure according to another embodiment of the present invention.

First, referring to FIG. 12, the camshaft support structure includes the camshaft 19, a cylinder head 33 and a bearing cap 33c to house the camshaft 19 as housings, and the needle roller bearing 41 rotatably supporting the camshaft 19 with respect to the housing.

The needle roller bearing 41 includes the arc-shaped outer ring members 42, needle rollers 43 as rollers, and a retainer 44 having a split line extending in an axial direction of the bearing, at one part on the circumference to retain the intervals of the needle rollers 43.

Figure 13:
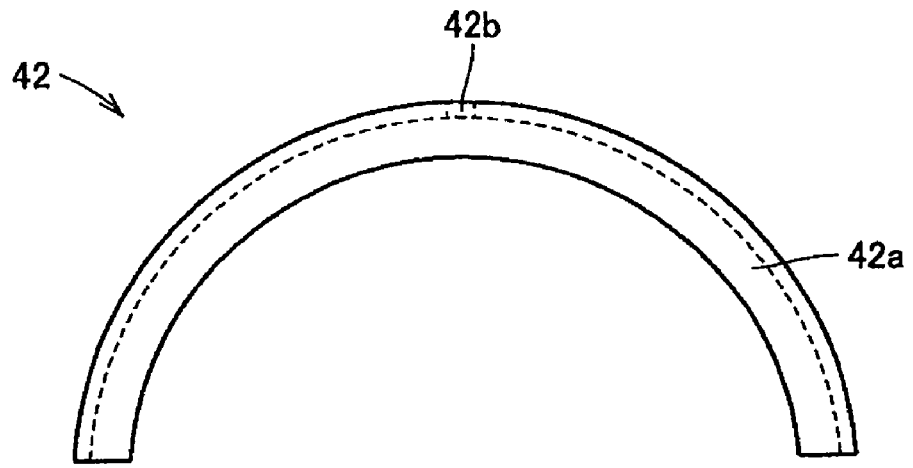
FIG. 13 is a view showing an outer ring member of a roller bearing in FIG. 12.

FIG. 13 is a side view showing the outer ring member 42. Referring to FIG. 13, the outer ring member 42 has a semicircular configuration having a center angle of 180° and includes a flange part 42a projecting from axial each end toward radial inner side to regulate the movement of the retainer 44 in the axial direction, and an oil hole 42b penetrating from the outer diameter surface to the inner diameter surface. In addition, the axial center part of the inner diameter surface of the outer ring member 42 functions as the track surface of the needle rollers 43. In addition, the oil hole 42b is provided at a position opposed to an oil path (not shown) provided in the housing, to supply lubricant oil into the needle roller bearing 41. In addition, the size, position, and number of the oil hole 42b depends on the size, position, and number of the oil path provided in the housing.

In addition, since the constitution of the retainer 44 is the same as that of the retainer 24 shown in FIGS. 7 and 8, its description will not be reiterated.

Next, a description will be made of procedures when the needle roller bearing 41 is assembled in the camshaft 19 with reference to FIGS. 12, 14 and 15.

First, the needle rollers 43 are set in pockets 44c of the retainer 44. Then, the split part is enlarged by use of elasticity thereof and the retainer 44 is assembled in the camshaft 19. Then, the retainer 44 is fixed by engaging a recess part 44d with a projection part 44e.

Then, the camshaft 19 around which the retainer 24 is wound and fixed, the outer ring member 42, and the bearing cap 33c are assembled in the cylinder head 33 in this order and the cylinder head 33 and the bearing cap 33c are fixed by fastening a bolt.

According to the above assembling procedures, the camshaft 19, the outer ring member 42, the retainer 44, and the housing are arranged concentrically, so that the needle roller bearing 41 in which the needle rollers 43 can stably rotate is provided.

In addition, the track surface positioned on the radial outer side of the needle roller 43 is composed of the inner diameter surface of the outer ring member 42 and the inner peripheral surface of the cylinder head 33. Thus, the inner diameter dimension of the cylinder head 33 is set so as to be smaller than the inner diameter dimension of the bearing cap 33c by the thickness of the outer ring member 42 so that a connection part between the outer ring member 42 and the inner diameter surface of the cylinder head 33 is smooth. In addition, in view of thermal expansion and a production error, a small gap is provided between the outer ring member 42 and the cylinder head 33.

Thus, since the track surface of the needle roller 43 is composed of the inner diameter surface of the outer ring member 42 and the inner peripheral surface of the cylinder head 33 continued to the circumferential end of the outer ring member 42, the production cost of the needle roller bearing 41 can be lowered. In addition, when the camshaft 19 is divided into a load region and a non-load region in the peripheral direction, the outer ring member 42 is preferably arranged at a position in the load region. The outer ring member 42 is produced through many process steps as will be described below in order to obtain mechanical characteristics and surface roughness required for the track surface of the needle roller 43. Therefore, even when it is arranged at the position in the load region in which large load is applied, the smooth rotation of the needle roller 43 can be maintained.

In addition, the "load region" designates a region (region of 180° shown by an arc α in FIG. 14) of 90° from a direction of a maximum load applied from the camshaft 19 to the needle roller bearing 41 (direction shown by a phantom line $l_1$ in FIG. 14) toward right and left directions. Meanwhile, the "non-load region" designates a region (region shown by an arc β in FIG. 14) of 180° of on the opposite side of the maximum load direction, in which only a relatively small load is applied as compared with the load region (containing the case where the load is 0).

In addition, in the internal combustion engine 11 shown in FIG. 18, a maximum load applied from the camshaft 19 to the needle roller bearing 41 is reaction force of the force pushing the valves 17 and 18 downward against the valve springs 17c and 18c, and its direction (shown by an arrow in FIG. 18) is opposed to a direction in which the camshaft 19 pushes the valves 17 and 18.

In addition, at the time of assembling, the oil path (not shown) in the housing composed of the cylinder head 33 and the bearing cap 33c is to coincide with the oil hole 42b provided in the outer ring member 42. Thus, a lubricant oil amount supplied into the bearing is increased, and a lubricating property of the needle roller bearing 41 is improved.

Figure 16:
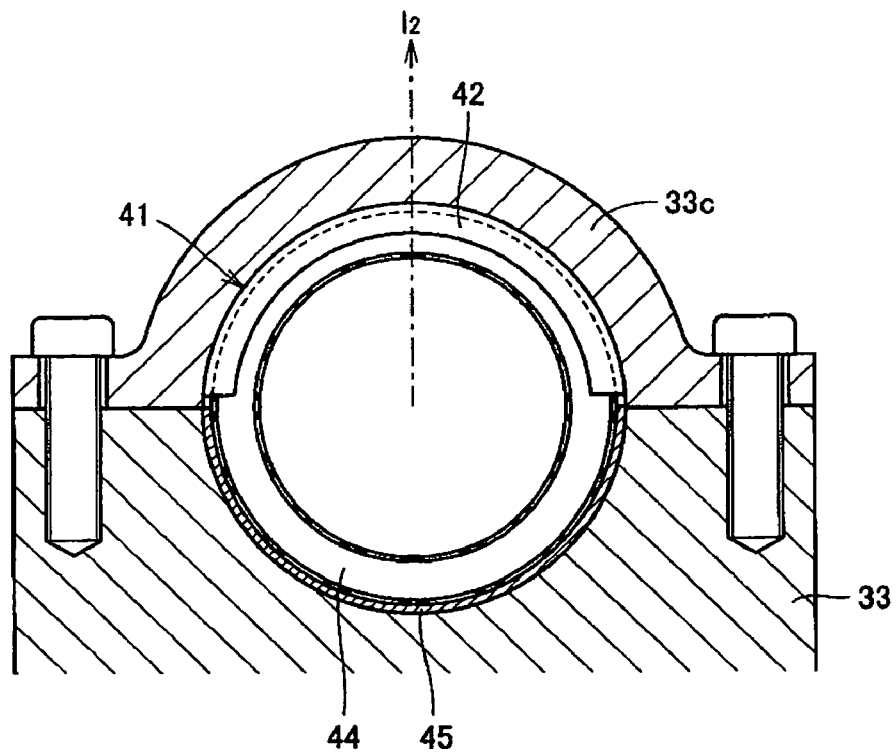
FIG. 16 is a view showing the camshaft support structure according to another embodiment of the present invention.

According to the camshaft support structure in the above embodiment, although one part of the track surface of the needle roller 43 is made up of the inner peripheral surface of the cylinder head 33, a track surface may be formed of another member fit in the inner peripheral surface of the cylinder head 33. For example, as shown in FIG. 16, an arc-shaped ring member 45 may be arranged so as to be connected to the circumferential end of the outer ring member 42. Since this ring member is arranged in the non-load region, it may be formed by pressing metal to have a curvature or may be molded by injecting a resin material. In addition, according to this embodiment, the ring member 45 is to be regarded as a component of the housing.

In addition, although the needle roller bearing 41 is employed as the bearing to support the camshaft 19 in the above embodiment, the present invention can be applied to another roller bearing such as a cylindrical roller bearing and a long roller bearing.

In addition, although the outer ring member 42 is the semicircular configuration having the center angle of 180° in the above embodiment, the outer ring member 42 may have any center angle as long as it can contain the entire load region. For example, an outer ring member having a small center angle is used when it is used in a circumstance having a small load region, and an outer ring member having a large center angle is used when it is used in a circumstance having a large load region. Similarly, the retainer 44 may have any configuration.

In addition, although the resin retainer that is high in production efficiency and high in elastic deformability has been shown as the retainer 44 in the above embodiment, the retainer may be a cut retainer produced by a cutting process or a pressed retainer produced by pressing a steel plate.

In addition, the needle roller bearing 41 according to the above embodiment is not used only as the bearing to support the camshaft 19 but also widely used as a bearing to support the shaft part 15a of the crankshaft 15 shown in FIG. 19 and a rocker shaft.

Still furthermore, although the present invention can be applied to a single-cylinder internal combustion engine, it is preferably used as the bearing to support the part in which the needle roller bearing 21 cannot inserted in the axial direction, like the shaft part 15a of the crankshaft 15 shown in FIG. 19 and the shaft part 19b of the camshaft 19 shown in FIG. 20 used in a multicylinder engine.

The camshaft support structure according to another embodiment of the present invention shown in FIG. 12 will be described with reference to FIG. 17. Since the basic constitution of the camshaft support structure is the same as the camshaft support structure shown in FIG. 14, the same part will not be described but a different point will be described mainly.

Figure 17:
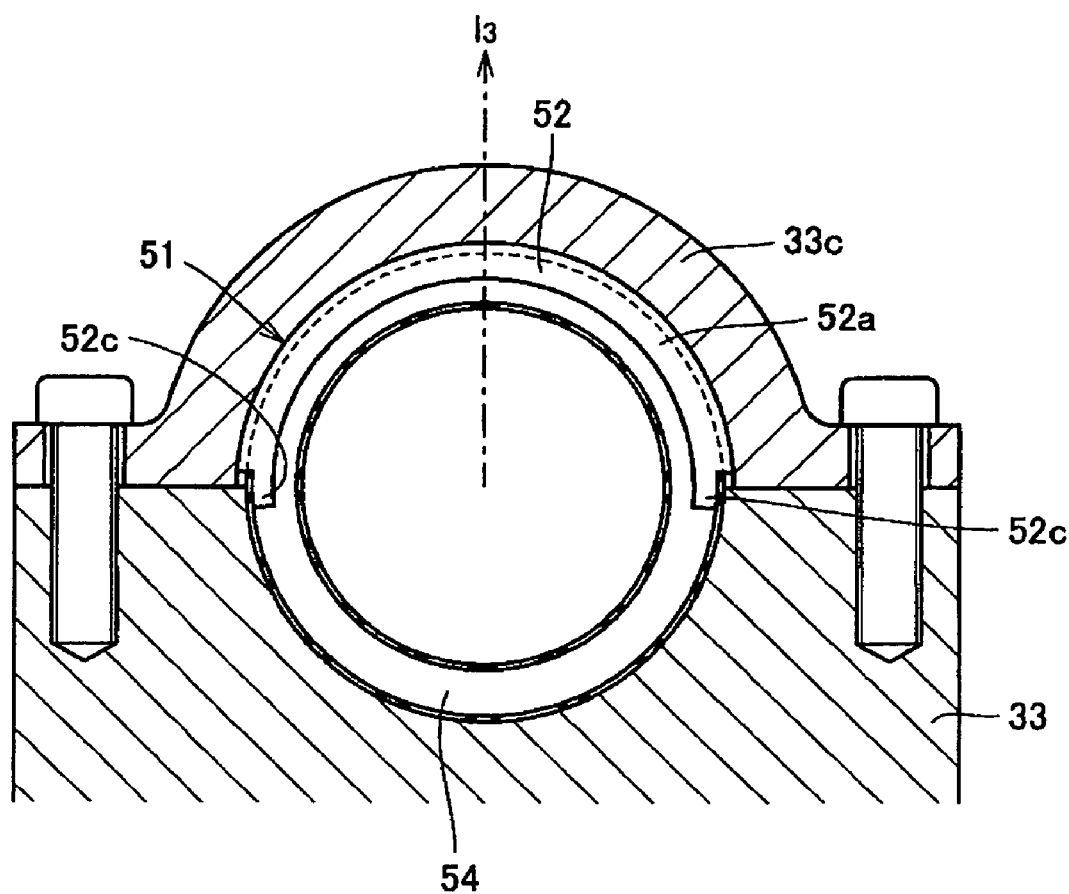
FIG. 17 is a view showing a camshaft support structure according to still another embodiment of the present invention.

Referring to FIG. 17, the camshaft support structure includes the housings 33 and 33c, the camshaft 19, and a needle roller bearing 51 rotatably supporting the camshaft 19 with respect to the housings 33 and 33c. In addition, an outer ring member 52 employed in the needle roller bearing 51 has a semicircular configuration having an center angle of 180°, and includes a flange part 52a projecting from axial each end to the radial inner side to regulate the axial movement of a retainer 54. This flange part 52a further includes a projection part 52c projecting from circumferential each end of the outer ring member 52 to the circumferential direction.

According to the above constitution, the axial positioning of the retainer 54 can be implemented more definitely. Especially, a great effect is achieved when a segment retainer formed by connecting a plurality of segments in the circumferential direction is used. In addition, this projection part 52c may be integrally formed in a press process step as will be described below, or may be attached by welding after the outer ring member 52 has been formed.

Next, a production method of the outer ring member 42 shown in FIG. 13 will be described. In addition, the same part as the production method of the outer ring member 22a will not be described but a different point will be described mainly. More specifically, since the composition of the starting material and the heat treatment step are the same, their description will not be reiterated.

According to the specific production process of the outer ring member 42, first, an outline of the outer ring member 42 is formed from a steel plate by a punching process. In addition, when a progressive press is used, a pilot hole to determine a process position in each process step is to be provided and a connection part 26 is to be provided between the adjacent outer ring members.

Then, the flat-shaped outer ring member 42 is bent so as to have a predetermined curvature by a bending process, and the flange 42a is formed by bending the axial each end to the radial inner side. In this step, the bending process is performed in stages to prevent the damage of a material and the like.

After the above press process step, a heat treatment is performed to obtain predetermined mechanical characteristics such as hardness required for the outer ring member 42. In addition, surface hardness Hv of the inner diameter surface of the outer ring member 42 functioning as a track ring has to be 635 or more.

Thus, after the heat treatment, a grinding process is performed to smooth the inner diameter surface serving as the track surface of the needle roller 43. A barrel-polishing is used as a grinding method.

The above embodiments can be combined optionally. Thus, a synergetic effect can be generated due to the combination.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention is advantageously applied to the roller bearing to support the camshaft of a car engine, the camshaft support structure and the internal combustion engine.

The invention claimed is:

1. A roller bearing comprising:
   an outer ring formed by connecting a plurality of arc-shaped outer ring members in a circumferential direction, each outer ring having side edges spaced apart by a width of the outer ring member and opposing and circumferentially spaced apart free ends; and
   a plurality of rollers arranged along an inner diameter surface of said outer ring, wherein
   said outer ring member has engagement claws provided at one of the circumferentially spaced apart free ends of said outer ring member, the circumferentially spaced apart free end extending in a direction of a rotation axis of the roller bearing, the engagement claws bent radially toward an outer side of the outer ring member so as to engage with a housing, and
   a slope surface is provided at one or each circumferentially spaced apart free end on an inner diameter surface of said outer ring member, and a contour line of said slope surface is along a direction perpendicular to a revolution direction of said roller;
   each engagement claw skirting around an axial center serving as a track surface in the outer ring member and being arranged on a straight line parallel to the rotation axis of the roller bearing.

2. The roller bearing according to claim 1, wherein
   when it is assumed that a thickness of the thickest part of said outer ring member is $t_0$, and a thickness of said slope surface at the circumferential end is t, a relation is satisfied as follows $$0.05 \leq t/t_0 \leq 0.5.$$

3. The roller bearing according to claim 1, wherein
   when an inclination angle of said slope surface is $\theta$, a relation is satisfied as follows $$10° \leq \theta \leq 45°.$$

4. A camshaft support structure comprising:
   a camshaft;
   a housing to house said camshaft; and the roller bearing according to claim 1 to rotatably support said camshaft with respect to said housing.

5. The camshaft support structure according to claim 4, wherein
the track surface positioned on a radial outer side of said plurality of rollers is composed of an inner diameter surface of said outer ring member set in a region of said housing to house said camshaft, and an inner peripheral surface of said housing connected to the circumferential end of said outer ring member.

6. The camshaft support structure according to claim 5, wherein
said outer ring member is positioned at a region within a load region of said camshaft.

7. A camshaft support structure comprising:
a camshaft;
a housing to house said camshaft; and
a roller bearing to rotatably support said camshaft with respect to said housing, wherein
said roller bearing comprises an arc-shaped outer ring member and a plurality of rollers, the arc shaped outer ring member having opposing side edges spaced apart by a width of the arc shaped outer ring member and opposing and circumferentially spaced apart free ends, and
a track surface positioned on a radial outer side of said plurality of rollers is composed of an inner diameter surface of said outer ring member set in a region of said housing to house said camshaft, and an inner peripheral surface of said housing connected to the circumferentially spaced apart free end of said outer ring member,
wherein said arc-shaped outer ring member has engagement claws provided at one of the circumferentially spaced apart free ends of said outer ring member, the circumferentially spaced apart free end extending in a direction of a rotation axis of the roller bearing, the engagement claws bent radially toward an outer side of the arc-shaped outer ring member so as to engage with a housing, each engagement claw skirting around an axial center serving as a track surface in the arc-shaped outer ring member and being arranged on a straight line parallel to the rotation axis of the roller bearing.

8. An internal combustion engine comprising:
a housing;
a cylinder provided in said housing;
a valve to open and close a supply path and an exhaust path connected to said cylinder;
a camshaft to control opening and closing timings of said valve; and
the roller bearing according to claim 1 to rotatably support said camshaft.

* * * * *